P. McCARTHY.
SHOAL WATER ALARM.
APPLICATION FILED JUNE 1, 1908.
906,649.
Patented Dec. 15, 1908.
2 SHEETS—SHEET 1.
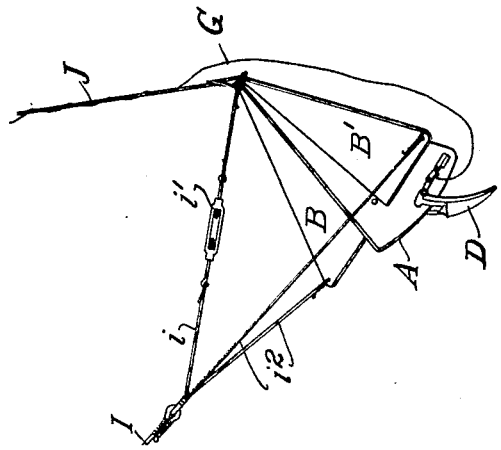
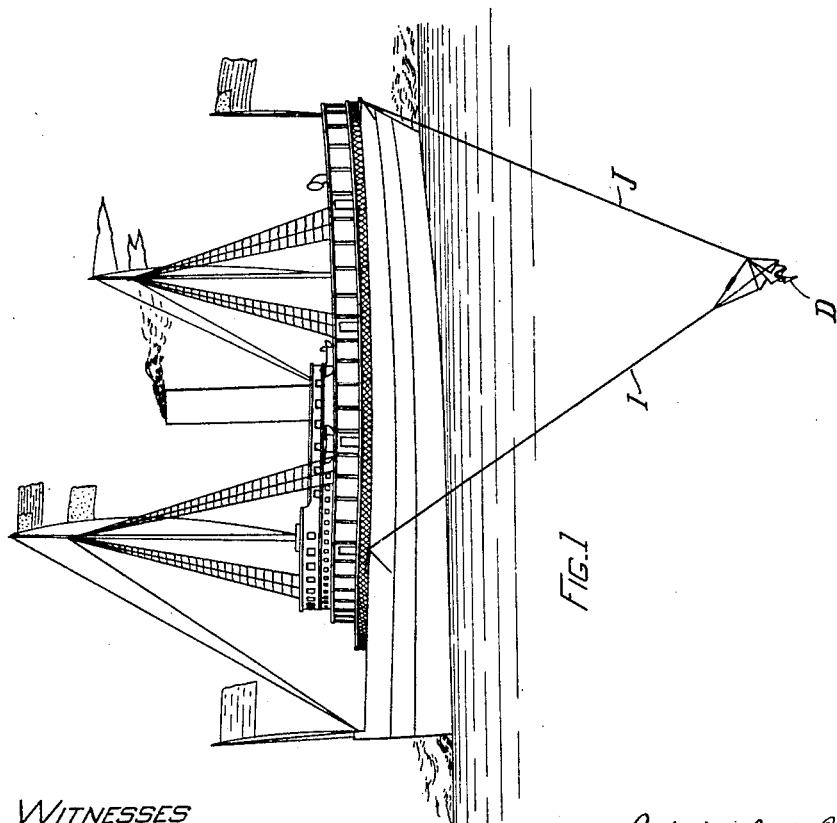
WITNESSES
O. T. Palmer
Joseph T. Brennan
INVENTOR
Patrick McCarthy.
by Mitchell, Chadwick & Kent
his attorneys.

P. McCARTHY.
SHOAL WATER ALARM.
APPLICATION FILED JUNE 1, 1908.
906,649.
Patented Dec. 15, 1908.
2 SHEETS—SHEET 2.
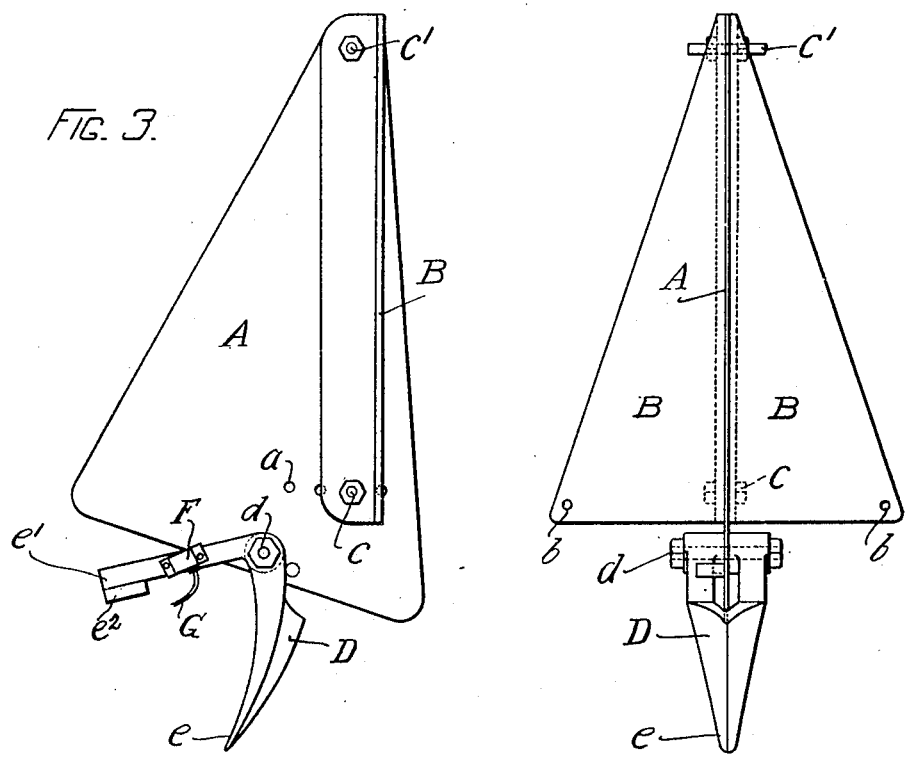
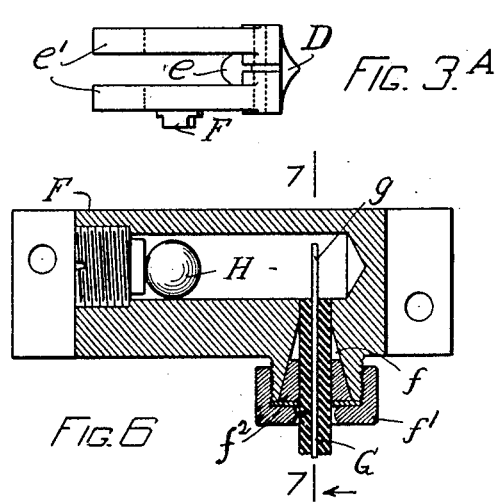
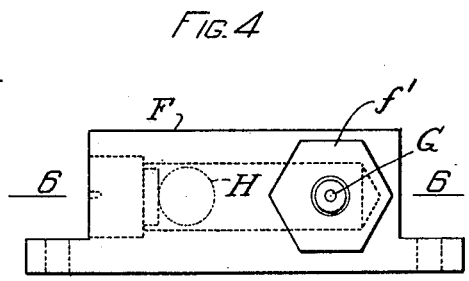
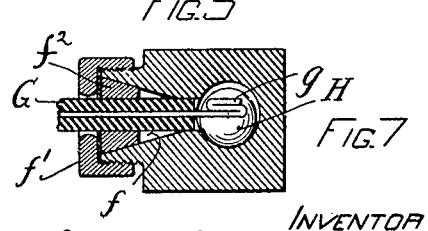
WITNESSES
A. T. Palmer
Joseph T. Brennan
INVENTOR
Patrick McCarthy
by Mitchell, Chadwick & Kent
his attorneys.

UNITED STATES PATENT OFFICE.

PATRICK McCARTHY, OF CLEVELAND, OHIO.

SHOAL-WATER ALARM.

No. 906,649.      Specification of Letters Patent.      Patented Dec. 15, 1908.

Application filed June 1, 1908. Serial No. 435,876.

*To all whom it may concern:*

Be it known that I, PATRICK MCCARTHY, a citizen of the United States, and resident of Cleveland, in the county of Cuyahoga and State of Ohio, have invented new and useful Improvements in Shoal-Water Alarms, of which the following is a specification.

My invention is a shoal water alarm for vessels, which may be adjusted to travel in the water at a predetermined depth, and which will transmit a signal to the ship above when it comes in contact with the bottom. It is highly important in a device of this character that it should be reliable in operation and that it should under all conditions of service travel at the desired depth, for, if variations in the speed of the vessel or currents or the like can operate to lessen or increase the depth at which the instrument travels, the device instead of being a safety device becomes a trap for the navigator who relies thereon; for example, suppose such a device in use upon a vessel moving at six knots an hour travels at fifteen fathoms, and upon an increase of speed the device, as a result of the increased drag of the vessel and the consequent increased resistance of the water, trails out and travels at only ten or five fathoms deep, the navigator supposing that the device still travels at fifteen fathoms, might be led into fatal action in reliance upon the false information supplied by the alarm device or the absence of information that the vessel was within the fifteen fathom sounding.

It is the object of my invention to provide a device which will, under all conditions of speed, travel at the predetermined depth, and which will travel abreast the ship without trailing.

In the drawings: Figure 1 is a perspective view of a vessel operating the shoal water alarm, the water being supposed transparent, to show the device as in use; Fig. 2 is a perspective view upon an enlarged scale, for clearness, of the device shown in Fig. 1; Fig. 3 is a side elevation of the device and Fig. 3ª a plan view of the contact member; Fig. 4 is a front elevation of the device; Fig. 5 is a side elevation of the box F, the interior being indicated in dotted lines; Fig. 6 is a sectional plan view of box F; and Fig. 7 a cross section on line 7—7 of Fig. 6, looking in the direction of the arrow.

A is a fore and aft fin and B B' are side fins connected to the fin A and to each other by bolts $c$ $c'$ passing through suitable apertures $a$ in the fin A. The bolt $c'$ in operation serves for the attachment of one member $i$ of a bridle, as will be later explained, and apertures $b$ serve for the attachment of other members $i^2$ of the bridle, while the bolt $c'$ receives one end of a back stay J as will be hereafter described.

Pivoted upon the lower edge of fin A by a bolt $d$ is a forked contact device D one end, $e$, of which projects downwardly below the fin and the other end, $e'$, of which normally projects rearwardly and downwardly at an angle to the other member of the contact device. The member $e'$ upon one side of the fin, in addition to suitable balance weights $e^2$ which both members $e'$ carry, carries a box F suitably arranged to be waterproof. At one side of this box is a stuffing box made up of a conical chamber $f$ and a screw cap $f'$ and through the cap $f'$, packing plug $f^2$, and chamber $f$, an insulated wire G projects its bare end $g$ into the interior of box F. Within box F is placed a metal ball H free to roll in either direction under the influence of gravity.

The operation is as follows:—The device is attached to a suitable drag line or cable I, preferably of metal, say, a quarter inch wire cable, the other end of which is connected to a projecting bar, forward. The connection between the device and the drag cable I is preferably by a three strand bridle $i$, $i^2$, one member $i$ passing to bolt $c'$ and the other two, $i^2$, to apertures $b$. Member $i$ has a turnbuckle $i'$ for purposes of adjustment. By the bolt $c'$ is attached a stop cable or back stay J of stout wire preferably, and this leads aft to a suitable projecting bar. The members of the bridle may be altered in their relative length to one another by the turnbuckle $i'$ or other suitable device so as to vary the angle, as desired, at which the device drags through the water at the end of drag cable I and the fins B B' may also be adjusted by means of bolt $c$ and holes $a$ to varying angles. The apparatus being lowered overboard at the end of stop cable J the fin A is presented to the water with its front and back edges in line with the course of the ship and with the surfaces of fins B B' across the line of movement of the ship. As the drag cable begins to draw the device through the water the fins B B' assume an angle to the plane of the water line with the lower edge of the fins in advance towards the bow of the ship or in the direction of forward movement. The resultant of the pressure of the water upon the fins B B′ is to drive the device downward, in the arc of a circle of which the drag cable is the radius and this movement continues until checked and overcome by the back stop J, but the tendency to dive still continues, so long as the fins B B′ present an inclined plane the forward end of which is lower than the rear end. The diving tendency is still further increased by the preferred form of fins B B′ in which the surface toward the forward end of the fin is much greater than that toward the rear end (see Fig. 4). The diving tendency may be suitably controlled by the adjustment of the bridle or by adjustment of the fins B B′ upon fin A or by a combination of these adjustments.

The electric circuit closer F H which I have shown is a suitable device for the purpose but any suitable alarm signal device may be substituted therefor.

In operation the device will tend constantly to seek a lower level, the drag of the ship being converted, by the reaction of the fins B B′ upon the water, into a depressing and driving force acting upon the device to overcome the normal tendency of an object not provided with suitable means to convert the dragging force into a force operating perpendicular to the line of the dragging force, which normal tendency is to trail out more or less straight according to the force of the drag and the weight and resistance of the object. The drag cable I and the back stop J coöperate to create and control this force, the device resisting the drag of the drag cable and wedging itself downward upon the same principle that a kite rides upward across the wind. An object of the back stop is to check the movement of the device downward while the fins B B′ are still at a considerable angle so that the downward pressure is still great, the device attaining a steady position with both drag and back stays under tension. The forked contact device D is carried below the lower edge of the fin A the end e hanging down and the ends e′ projecting backward and downward to either side of fin A, the device D being pivoted near its middle to the fin A. Upon one of the ends e′ of D is secured the box F, the ball H, owing to the normal rearward slant of end e′ and box F resting at the lower end of the box and clear and away from the exposed end g of the wire G. As the device travels along, if the water shoals so that the depending end e of the contact device comes into contact with the bottom, end e of contact device D will be forced backward, relatively speaking, by being held while the device as a whole travels on, the rear end e′ being lifted so that the ball H will roll forward into contact with the exposed end g of wire G. Wire G is insulated and is carried up upon the back stay J to the ship, while the other element of a complete electric circuit may be either of the cables I J or a separate wire. I prefer to use the back stay J for this purpose and therefore use a wire rope for stay J which connects with the metallic body of the device and thus with the metallic box F and ball H, so that when ball H strikes wire G as it rolls forward the circuit is completed and an alarm mechanism which is in the circuit is operated upon the ship.

I claim:—

1. In a shoal water alarm, the combination with a drag cable of an inclined blade at its free end; a stop cable to limit the depth to which the blade shall dive and signal means to indicate to the vessel when the device is in contact with the bottom.

2. In a shoal water alarm, the combination with a drag cable I, of a fin A; fins B B′ adjustable in their angle with reference to the drag cable; a contact piece D; a stop cable J and an electric circuit having a signal device upon the ship which is closed or opened by the action of the contact piece D striking the bottom, all organized and operating substantially as described.

3. In a shoal water alarm the combination with a drag cable of a three strand bridle having a turnbuckle in one of the strands; an inclined blade at the free end of the cable adjustably secured to said cable by said bridle; a stop cable to limit the depth to which the blade shall dive and signal means to indicate to the ship when the device is in contact with the bottom.

Signed by me at Cleveland, Ohio, this 23rd day of May, 1908.

PATRICK McCARTHY.

Witnesses:
G. W. SURLES,
W. A. THOMAS.